United States Patent
Reghu et al.

(10) Patent No.: US 11,899,035 B2
(45) Date of Patent: Feb. 13, 2024

(54) METHODS FOR DETERMINING THE DENSITY OF POLYMER PARTICLES FOR QUALITY CONTROL MATERIALS USING SPLIT FLOW THIN (SPLITT) CELL FRACTIONATION PRINCIPLE AND FRACTIONATION CELL FOR CARRYING OUT THE METHODS

(71) Applicant: IDEXX Laboratories, Inc., Westbrook, ME (US)

(72) Inventors: Aravind Reghu, Scarborough, ME (US); Jui Ming Lin, Falmouth, ME (US); James Russell, North Yarmouth, ME (US); Jeremy Hammond, Standish, ME (US)

(73) Assignee: IDEXX Laboratories, Inc., Westbrook, ME (US)

( * ) Notice: Subject to any disclaimer, the term of this patent is extended or adjusted under 35 U.S.C. 154(b) by 59 days.

(21) Appl. No.: 17/480,607

(22) Filed: Sep. 21, 2021

(65) Prior Publication Data
US 2022/0091004 A1 Mar. 24, 2022

Related U.S. Application Data

(60) Provisional application No. 63/081,029, filed on Sep. 21, 2020.

(51) Int. Cl.
*G01N 9/32* (2006.01)
(52) U.S. Cl.
CPC ...................................... *G01N 9/32* (2013.01)

(58) Field of Classification Search
CPC ...... G01N 30/0005; G01N 9/32; G01N 15/06; G01N 33/5375; G01N 15/0826; B01D 61/28; B01D 15/08
See application file for complete search history.

(56) References Cited

U.S. PATENT DOCUMENTS

| 4,657,676 A | 4/1987 | Keary et al. |
| 8,535,536 B1 | 9/2013 | Gale et al. |

OTHER PUBLICATIONS

Harlan K. Jones, Colloid Characterization by Sedimentation Field-Flow Fractionation, 1987, pp. 140-152 (Year: 1987).*

(Continued)

*Primary Examiner* — John Fitzgerald
*Assistant Examiner* — Truong D Phan
(74) *Attorney, Agent, or Firm* — Bodner & Bodner, PLLC; Gerald T. Bodner; Christian P. Bodner

(57) ABSTRACT

A method for determining the density of particles includes passing a carrier fluid and particles through a fractionation cell at a predetermined rate, where the carrier fluid has a predetermined density, the fractionation cell has a housing including a first axial end and a second axial end and the fractionation cell defines an interior carrier fluid flow-through channel, and an upper fluid outlet and a lower fluid outlet positioned below the upper fluid outlet, passing the carrier fluid and the particles through the upper fluid outlet and the lower fluid outlet, measuring a first concentration of particles passing through the upper fluid outlet, measuring a second concentration of particles passing through the lower fluid outlet, and determining a density of the particles based at least in part on the first concentration and the second concentration of particles.

9 Claims, 6 Drawing Sheets

(56) References Cited

OTHER PUBLICATIONS

Notification of Transmittal of the International Search Report and the Written Opinion of the International Searching Authority, or the Declaration, dated Dec. 20, 2021, which was issued by the International Searching Authority of WIPO in Applicant's corresponding international PCT application having Serial No. PCT/US2021/051271, filed on Sep. 21, 2021.
Written Opinion of the International Searching Authority, dated Dec. 20, 2021, which was issued by the International Searching Authority of WIPO in Applicant's corresponding international PCT application having Serial No. PCT/US2021/051271, filed on Sep. 21, 2021.
International Search Report, dated Dec. 20, 2021, which was issued by the International Searching Authority of WIPO in Applicant's corresponding international PCT application having Serial No. PCT/US2021/051271, filed on Sep. 21, 2021.
Giddings, et al., "*Accurate Measurement of Density of Colloidal Latex Particles by Sedimentation Field-Flow Fractionation*", Langmuir, vol. 11, Issue 7, pp. 2399-2404, Jul. 1, 1995. Abstract and first page available at: https://pubs.acs.org/doi/abs/10.1021/la00007a014 (last accessed on Feb. 1, 2022) (copy not enclosed).
Lee, et al., "*Implementation of splitter-less SPLITT fractionation and its application to large scale-fractionation of sea sediment*", Microchemical Journal, vol. 95, Issue 1, pp. 11-19, May 2010. Abstract and full text available at: https://www.researchgate.net/publication/224962653_Implementation_of_splitter-less_SPLITT_fractionation_and_its_application_to_large_scale-fractionation_of_sea_sediment (last accessed on Feb. 1, 2022) (copy not enclosed).
Koliadima, et al., "*Simultaneous determination of particle size and density in polydisperse colloidal samples by sedimentation field-flow fractionation*", Journal of High Resolution Chromatography, vol. 13, Issue 5, pp. 338-342, May 1990. Abstract available at: https://onlinelibrary.wiley.com/doi/10.1002/jhrc.1240130509 (last accessed on Feb. 1, 2022) (copy not enclosed).
Caldwell, et al., "*Measurement of the size and density of colloidal particles by combining sedimentation field-flow fractionation and quasi-elastic light scattering*", Colloids and Surfaces, vol. 18, Issue 1, pp. 123-131, May 1986. Abstract available at: https://www.sciencedirect.com/science/article/abs/pii/0166662286801998?via%3Dihub (last accessed on Feb. 1, 2022) (copy not enclosed).
Giddings, "*Field-flow fractionation: analysis of macromolecular, colloidal, and particulate materials*", Science, vol. 260, Issue 5113, pp. 1456-1465, Jun. 4, 1993. Abstract available at: https://www.science.org/doi/10.1126/science.8502990 (last accessed on Feb. 1, 2022) (copy not enclosed).
Giddings, et al., "*Accurate Measurement of Density of Colloidal Latex Particles by Sedimentation Field-Flow Fractionation*", Langmuir, vol. 11, Issue 7, pp. 2399-2404, Jul. 1, 1995. Abstract and first page available at: https://pubs.acs.org/doi/abs/10.1021/la00007a014 (last accessed on Feb. 1, 2022) (copy not enclosed).
Giddings, et al., "*Sedimentation field-flow fractionation*", Analytical Chemistry, vol. 46, Issue 13, pp. 1917-1924, Nov. 1, 1974. Abstract and first page available at: https://pubs.acs.org/doi/10.1021/ac60349a046 (last accessed on Feb. 1, 2022) (copy not enclosed).
Blanchard, "*Method for Determining the Density of Microsize Spherical Particles*", GSA Bulletin, vol. 78, Issue 3, pp. 385-404, Mar. 1, 1967. Abstract and first page available at: https://pubs.geoscienceworld.org/gsa/gsabulletin/article-abstract/78/3/385/6183/Method-for-Determining-the-Density-of-Microsize (last accessed on Feb. 1, 2022) (copy not enclosed).
Tadjiki, et al., "*Measurement of the Density of Engineered Silver Nanoparticles Using Centrifugal FFF-TEM and Single Particle ICP-MS*", Analytical Chemistry, vol. 89, Issue 11, pp. 6056-6064, May 10, 2017. Abstract available at: https://pubs.acs.org/doi/abs/10.1021/acs.analchem.7b00652 (last accessed on Feb. 1, 2022) (copy not enclosed).
Nagy, "*Density determination of low density polymer latexes by sedimentation field flow fractionation*", Analytical Chemistry, vol. 61, Issue 17, pp. 1934-1937, Sep. 1, 1989. Abstract and first page available at: https://pubs.acs.org/doi/10.1021/ac00192a032 (last accessed on Feb. 1, 2022) (copy not enclosed).
Contado, et al., "*Complementary use of flow and sedimentation field-flow fractionation techniques for size characterizing biodegradable poly(lactic acid) nanospheres*", Journal of Chromatography A, vol. 1157, Issue 1-2, pp. 321-335, Jul. 20, 2007. Abstract and full text available at: https://www.ncbi.nlm.nih.gov/pmc/articles/PMC2829328/ (last accessed on Feb. 1, 2022) (copy not enclosed).
Jiang, et al., "*Preparative particle separation by continuous SPLITT fractionation*", Journal of Microcolumn Separations, vol. 9, Issue 4, pp. 261-273, Sep. 9, 1997. Abstract available at: https://onlinelibrary.wiley.com/doi/10.1002/%28SICI%291520-667X%281997%299%3A4%3C261%3A%3AAID-MCS3%3E3.0.CO%3B2-%23 (last accessed on Feb. 3, 2022) (copy not enclosed).
Contado, "*Particle Size Separation | Split Flow Thin Cell (Splitt) Separation*", Encyclopedia of Separation Science, pp. 1831-1837, 2000. First page available at: https://www.sciencedirect.com/science/article/pii/B0122267702069519?via%3Dihub (last accessed on Feb. 1, 2022) (copy not enclosed).
Lee, et al., "*Implementation of splitter-less SPLITT fractionation and its application to large scale-fractionation of sea sediment*", Microchemical Journal, vol. 95, Issue 1, pp. 11-19, May 2010. Abstract and full text available at: https://www.researchgate.net/publication/224962653_Implementation_of_splitter-less_SPLITT_fractionation_and_its_application_to_large_scale-fractionation_of_sea_sediment (last accessed on Feb. 1, 2022) (copy not enclosed).
Jones, et al., "*Colloid Characterization by Sedimentation Field-Flow Fractionation—V. Split Outlet System for Complex Colloids of Mixed Density*", Journal of Colloid and Interface Science, vol. 120, No. 1, pp. 140-152, Nov. 1, 1987. Abstract and full text available at: https://af.booksc.eu/book/2201011/85c1c9 (last accessed on Feb. 1, 2022) (copy not enclosed).
Springston, et al., "*Continuous particle fractionation based on gravitational sedimentation in split-flow thin cells*", Analytical Chemistry, vol. 59, Issue 2, pp. 344-350, Jan. 15, 1987. Abstract and first page available at: https://pubs.acs.org/doi/10.1021/ac00129a026 (last accessed on Feb. 1, 2022) (copy not enclosed).

\* cited by examiner

METHODS FOR DETERMINING THE DENSITY OF POLYMER PARTICLES FOR QUALITY CONTROL MATERIALS USING SPLIT FLOW THIN (SPLITT) CELL FRACTIONATION PRINCIPLE AND FRACTIONATION CELL FOR CARRYING OUT THE METHODS

CROSS-REFERENCE TO RELATED APPLICATIONS

This application is related to U.S. Provisional Patent Application Ser. No. 63/081,029, filed on Sep. 21, 2020, and titled "Method For Determining The Density Of Spherical Polymer Particles In Suspension Using Split Flow Thin (SPLITT) Cell Fractionation Principle", the disclosure of which is hereby incorporated by reference and on which priority is hereby claimed.

TECHNICAL FIELD

The present disclosure generally relates to techniques for determining the density of particles used in colloidal chemistry, and more particularly relates to techniques for determining the density of different types of spherical polymer beads suspended in a liquid.

BACKGROUND

Medical guidance for many medical diagnostic systems, such as hematology analyzers, recommends analyzing a sample as soon as possible after drawing the sample. This recommendation can be difficult if the sample is obtained at the point of care, but the test is to be performed at an external laboratory. Therefore, many doctors and veterinarians prefer to have point-of-care (POC) systems to analyze fresh samples. Medical diagnostic systems rely on quality control procedures to confirm system functionality and assure result accuracy. However, quality control procedures may not be familiar to POC offices, and this lack of familiarity can be a significant reason for doctors and veterinarians to send samples to external laboratories.

BRIEF SUMMARY

To calibrate and/or confirm proper operation of POC medical diagnostic systems, quality control materials are passed through the POC medical diagnostic systems. Readings from instruments and/or analyzers within the POC medical diagnostic systems associated with the quality control materials can be compared to identify deviations from a standard or target chemical composition. Deviations from the standard or target chemical composition can be utilized to identify anomalies of the instruments and/or analyzers, and can be used to calibrate the instruments and/or analyzers or identify a need for servicing.

In some examples, quality control materials can include synthetic materials or the like. Quality control materials including synthetic materials may be stored in more forgiving conditions and may have a longer shelf-life than quality control materials including biological materials.

In some examples, the quality control materials may include polymer particles or beads. To formulate quality control materials that behave as desired in the POC medical diagnostic systems, it is desirable to understand the number and/or size of polymer particles within the quality control material. Among other features, the density of the polymer particles may be utilized to determine the number and/or size of polymer particles within the quality control material. Although the polymer composition can provide a density estimate, fabrication processes of the polymer particles can trap ethanol, water, etc., within the polymer particles, thereby changing the density of the polymer particles as compared to a pure polymer compound.

There are several different ways in which colloidal particle density can be determined. Of them, field flow fractionation (FFF) techniques are some of the most effective ways to separate particles based on size and can also be used to determine particle density. Sediment field flow fractionation technique (SdFFF), which is a sub-technique of FFF, is a common method in determining the density of polymers, emulsions and suspensions.

However, there are some disadvantages associated with the SdFFF technique such as low throughput due to its smaller load capacity. This can be mitigated by using a Split flow thin (SPLITT) cell technique. Since the separation path in a SPLITT fractionation technique is only a fraction of the thickness of the SPLITT cell, the separation can be achieved very quickly with high resolution. Another advantage of this technique is the ability to separate any material that can interact with an applied field and, therefore, has a broad applicability. Also, compared to other field flow fractionation techniques like SdFFF, the SPLITT cell technique is easier to use and is more cost effective.

The basic principles of SPLITT fractionation are illustrated by FIGS. 1a and 1b, which show schematic illustrations of the side view of a SPLITT channel. The two inlets and two outlets in each channel are separated by inlet and outlet splitters. Particles are introduced through one inlet (inlet a' in FIGS. 1a and 1b) whereas the particle-free carrier fluid is introduced through the other inlet (inlet b' in FIGS. 1a and 1b). The flow rates of liquid through inlet b' ($V_b'$) is much larger than that through inlet a' ($V_a'$), such that the lower substream overwhelms the upper substream, causing the stream planes of the combined flow to curve upward. The incoming particle stream is confined to a narrow lamina above the upper broken line (ISP). As the particles interact with and respond to a gravitational field applied to the transport region of the cell, they migrate slowly towards the lower cell wall. Particles with larger lateral migration velocity cross the transport region and lower broken line (OSP) and are collected from outlet b. The remaining particles are collected in outlet a. The function of the outlet splitter is to direct the flow streams above and below the inlet splitting plane into appropriate outlets. Thus, each operation of SPLITT fractionation will separate particles into fractions at or around a cutoff diameter where half of the particles exit outlet a while the other half exit outlet b. For example, in the example shown in FIG. 1(b), particles 4a having a diameter less than the cutoff diameter exit outlet a, while particles 4b having a diameter greater than the cutoff diameter exit outlet b. The cutoff diameter can be controlled by adjusting the total flow rate. Expressions for cutoff diameter ($d_c$) and field induced volumetric flow rate ($\Delta V$) are given in Equations (1) and (2), respectively, as shown below:

$$d_c = \sqrt{\frac{18\eta[V(t) + 0.5V(a')]}{\Delta\rho bLG}} \quad (1)$$

$$\Delta V = \frac{\Delta\rho bLGd^2}{18\eta} \quad (2)$$

where V(t) is the volumetric flow rate of the transport region, V(a') is the volumetric flow rate entering inlet a', ΔV is the volumetric flow rate of field induced migration, Δρ is the difference in density of particle and that of carrier, b is the breadth of the SPLITT cell (4 cm), L is the length of the SPLITT cell (20 cm), η is the carrier viscosity, d is the particle diameter and G is the gravitational acceleration. Thus, particles of a known density are sorted by their size and/or weight.

Fractionation can also be done using another mode called full feed depletion mode. In this mode, only a single inlet is used. This offers several advantages like higher throughput, less dilution of the sample and simplifying the system by eliminating the use of one pump. The cutoff diameter in this mode ($d_{cffd}$) is controlled by the volumetric flow rate through outlet a (V(a)), as given in Equation (3) below:

$$d_{cffd} = \sqrt{\frac{18\eta(V(a') - V(b))}{\Delta\rho bLG}} \quad (3)$$

where $V(a) = V(a') - V(b)$.

However, the above-described techniques may not be applicable when the particle density is unknown.

It is an object of the present disclosure to provide a method for determining the density of particles suspended in a liquid using a modified version of a SPLITT fractionation technique.

It is another object of the present disclosure to provide a method for determining the density of spherical polymer particles in suspension.

It is still another object of the present disclosure to provide a method for determining the density of different types of particles, such as polymer beads, troubleshooting analytic instruments or in calibrating such instruments, and in other applications involving colloidal chemistry.

It is another object of the present disclosure to provide a modified SPLITT fractionation technique that is a cost effective, easy to use, fast and highly accurate way to determine the density of different types of particles in suspension.

In accordance with one form of the present disclosure, a modified version of a SPLITT fractionation technique is used in determining the density of particles, such as different forms of spherical polymer beads, suspended in a liquid. In this method, the density of the carrier fluid is changed incrementally such that buoyancy is used for particle fractionation. In other words, the carrier fluid density is utilized to determine the unknown density of a particle. When neutral buoyancy is achieved as particle density matches the density of the carrier fluid, there is a split in particles through outlet a and outlet b. The particle concentration ratio, which is the ratio of particle concentration at outlet a and the particle concentration at outlet b, is governed by the flow rate of particles (i.e., particles/minute) through each outlet. Therefore, if the flow rate of the particles is the same through both outlets, there is a 50-50 split in particles through each outlet and the particle concentration ratio becomes 1. From this modified technique, the density of the particles may be determined, as will be explained in greater detail.

These and other objects, features and advantages of the present disclosure will be apparent from the following detailed description of illustrative embodiments thereof, which is to be read in connection with the accompanying drawings.

DETAILED DESCRIPTION

Figure 3A:
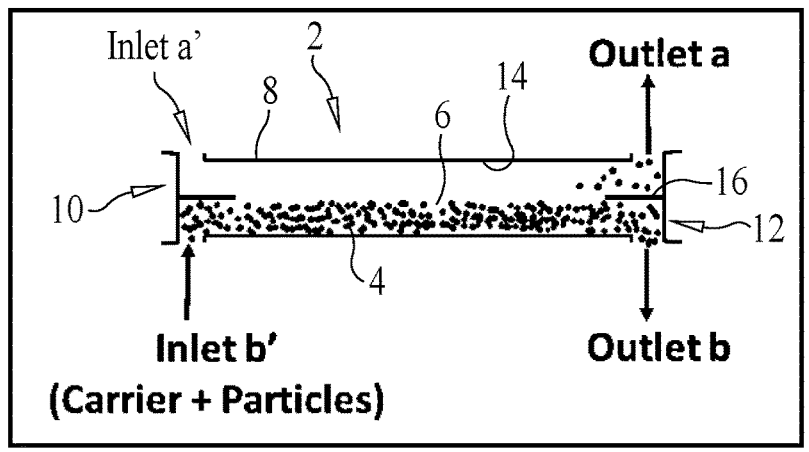
FIG. 3(a) is a pictorial diagram of a fractionation cell used in carrying out a method of determining the density of particles suspended in a liquid carrier flowing through the fractionation cell, and illustrating the situation where the density of the carrier fluid is less than the density of the particles.
Figure 3B:
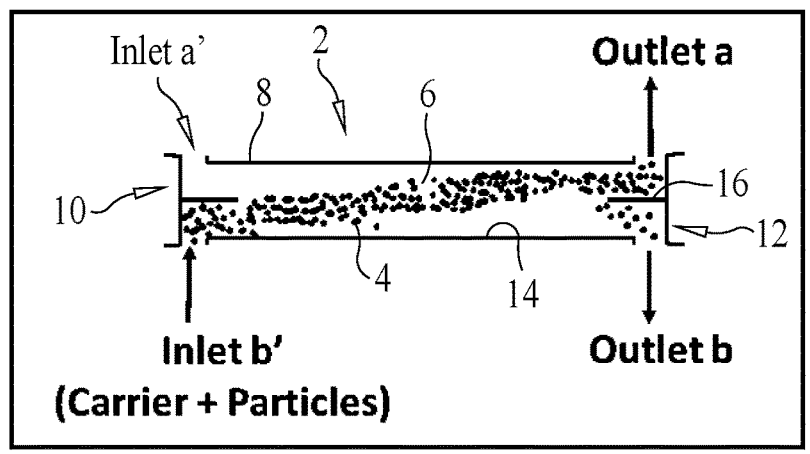
FIG. 3(b) is a pictorial diagram of a fractionation cell used in carrying out the method of determining the density of particles suspended in a liquid carrier flowing through the fractionation cell, and illustrating the situation where the density of the carrier fluid is greater than the density of the particles.
Figure 3C:
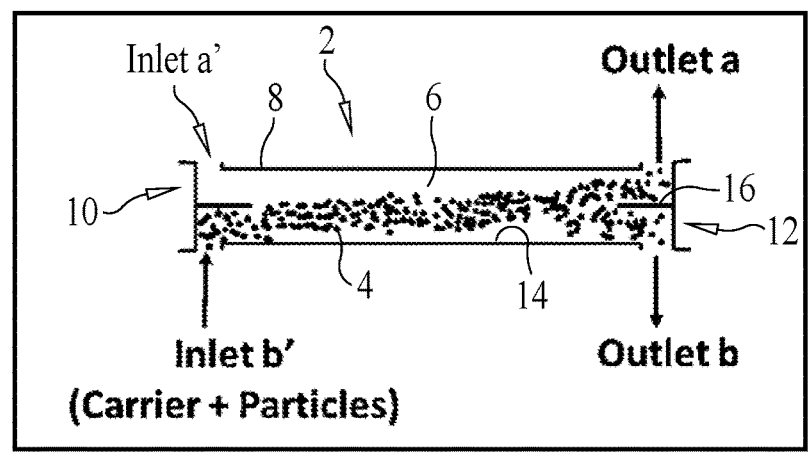
FIG. 3(c) is a pictorial diagram of a fractionation cell used in carrying out the method of determining the density of particles suspended in a liquid carrier flowing through the fractionation cell, and illustrating the situation where the density of the carrier fluid is equal to the density of the particles.

Reference should initially be had to FIGS. 3(a)-3(c) of the drawings, which show a fractionation cell or chamber 2 used in carrying out the method for determining the density of particles 4 suspended in a carrier fluid 6 in accordance with the present disclosure. More specifically, and in accordance with the method of the present disclosure, a carrier fluid 6 having a predetermined density is caused to flow axially through the fractionation cell 2 at a predetermined rate. The fractionation cell 2 has an elongated housing 8 having a first axial end 10 and a second axial end 12 situated axially opposite the first axial end 10. The elongated housing 8 of the fractionation cell 2 defines an interior, carrier fluid flow-through channel 14 extending between the first axial end 10 and the second axial end 12 of the housing 8. The fractionation cell 2 includes a fluid inlet b' in fluid communication with the channel 14. In some embodiments, the fluid inlet b' is situated at the first axial end 10 of the housing 8.

In the embodiment depicted in FIGS. 3(a)-3(c), the carrier fluid 6 and/or the particles 4 are introduced into the channel 14 of the fractionation cell 2 through the fluid inlet b'. The fractionation cell 2 is shown in FIGS. 3(a)-3(c) as including a fluid inlet a' in fluid communication with the channel 14. In some embodiments, fluid inlet a' is situated at the first axial end 10 of the housing 8. In some embodiments, the carrier fluid 6 and/or the particles 4 are introduced into the channel 14 of the fractionation cell 2 through the fluid inlet a'. In some embodiments, fluid inlet a' may be closed or omitted. In some embodiments, the carrier fluid 6 and/or particles 4 are introduced into the channel 14 of the fractionation cell 2 through the fluid inlet a' and the fluid inlet b'. In some embodiments, the splitter at the first axial end 10 of the housing 8 may be omitted.

In embodiments, the housing 8 of the fractionation cell 2 includes at least an upper fluid outlet a and a lower fluid outlet b spaced from the upper fluid outlet a. The upper fluid outlet a and the lower fluid outlet b are in fluid communication with the channel 14 defined by the housing 8 of the fractionation cell 2 and are situated at the second axial end 12 of the housing 8. In some embodiments, fluid outlet a is spaced vertically from fluid outlet b. Because the fluid outlet a is spaced apart from the fluid outlet b in the vertical direction, particles can be passed out the fluid outlet a or the fluid outlet b based at least in part on the relative density of the particles 4 with relation to the carrier fluid 6, as described in greater detail herein.

While in the embodiment depicted in FIGS. 3(a)-3(c), the fluid outlet a and the fluid outlet b are positioned on a perimeter of the housing 8, in some embodiments, fluid outlet a and/or fluid outlet b are disposed on the end face of the housing 8 at the second axial end 12 thereof. The carrier fluid 6 flows into the fluid inlet b', through the channel 14, and out the upper fluid outlet a and the lower fluid outlet b. In some embodiments, there is a divider or separator wall 16 extending from the second axial end 12 of the housing 8 at least partially into the channel 14 and is disposed between the upper fluid outlet a and the lower fluid outlet b.

The particles 4, whose density is determined by methods of the present disclosure, are suspended in the carrier fluid 6 and flow with the carrier fluid 6 through the channel 14 defined by the housing 8 of the fractionation cell 2. The particles suspended in the carrier fluid 6 flow through the upper fluid outlet a at a first particle flow rate (i.e., particles per minute), and flow through the lower fluid outlet b at a second particle flow rate (i.e., particles per minute).

In accordance with the method of the present disclosure, the first particle flow rate of the particles in the carrier fluid 6 through the upper fluid outlet a is measured and, similarly, the second particle flow rate of the carrier fluid 6 through the lower fluid outlet b is also measured.

In embodiments, the first particle flow rate is compared with the second particle flow rate. A ratio between the first particle flow rate and the second particle flow rate can be determined based at least in part on the comparison of the second particle flow rate with the first particle flow rate. If the ratio between the first particle flow rate and the second particle flow rate is determined to be about one (1), then it may be concluded from the measured substantially equal particle flow rates through the upper fluid outlet a and lower fluid outlet b that the density of the particles 4 suspended in the carrier fluid 6 is approximately equal to the predetermined density of the carrier fluid 6.

In particular and without being bound by theory, determination that the measured first particle flow rate is substantially the same as or equal to the measured second particle flow rate is indicative that the particles 4 are buoyantly suspended and equally distributed throughout the volume of the carrier fluid 6 as it flows through the channel 14 of the fractionation cell 2, as shown in FIG. 3(c). Equal or near equal distribution throughout the volume of the carrier fluid 6 is generally attributable to the carrier fluid 6 and the particles 4 having approximately the same density. In this circumstance, the particles 4 are divided substantially equally with substantially the same flow rates through the upper fluid outlet a and the lower fluid outlet b. In some embodiments, the first particle flow rate and the second particle flow rate are directly measured by detecting the rate of particles 4 flowing out through the upper fluid outlet a and the lower fluid outlet b, for example, via any an optical detection device or any other suitable device for determining the flow rate of the particles 4.

In some embodiments, the first particle flow rate and the second particle flow rate can be indirectly measured. For example and without being bound by theory, the first particle flow rate and the second particle flow rate have a direct relationship with the concentration of the particles (i.e., particles per unit volume) in the flow of liquid 6 through each of fluid outlet a and fluid outlet b. In particular, the higher the particle flow rate (through the fluid outlet a or the fluid outlet b), the higher the concentration of particles 4 suspended in the carrier fluid 6 flowing through the fluid outlet a or the fluid outlet b. Accordingly, the concentration of particles flowing through the fluid outlet a and the fluid outlet b is indicative of the density of the particles suspended in the liquid 6. This concentration of particles exiting fluid outlet a and fluid outlet b can be determined by collecting a volume of the flow of liquid 6 exiting fluid outlet a and fluid outlet b over the same time period and counting the number of particles in the collected volumes.

In embodiments, a first concentration of particles 4 passing through the upper fluid outlet a is measured. A second concentration of particles 4 passing through the lower fluid outlet b is measured, and a density of the particles 4 is determined based at least in part on the first concentration and the second concentration. For example and referring to FIG. 3(a), in some circumstances, the first concentration of particles 4 passing through the upper fluid outlet a is less than the second concentration of particles 4 passing through the lower fluid outlet b. In this circumstance, it can be determined that the density of the particles 4 is greater than the predetermined density of the carrier fluid 6. In particular, because the upper fluid outlet a is positioned above the lower fluid outlet b, and the particles 4 are denser than the carrier fluid 6, the particles 4 generally trend toward the lower portion of the housing 8, and more of the particles 4 exit through the lower fluid outlet b as compared to the upper fluid outlet a.

By contrast and referring to FIG. 3(b), in some circumstances, the first concentration of particles 4 passing through the upper fluid outlet a is greater than the second concentration of particles 4 passing through the lower fluid outlet b. In this circumstance, it can be determined that the density of the particles 4 is less than the predetermined density of the carrier fluid 6. In particular, because the upper fluid outlet a is positioned above the lower fluid outlet b, and the particles 4 are less dense than the carrier fluid, the particles 4 generally trend toward the upper portion of the housing 8, and more of the particles exit through the upper fluid outlet a as compared to the lower fluid outlet b.

Yet still, in some circumstances and referring to FIG. 3(c) the first concentration of particles 4 passing through the upper fluid outlet a is about the same as the second concentration of particles 4 passing through the lower fluid outlet b. In this circumstance, it can be determined that the density of the particles 4 is about the same as the predetermined density of the carrier fluid 6.

In embodiments, the density of the particles 4 can be calculated based at least in part on a comparison of the first concentration of particles passing through the upper fluid outlet a and the second concentration of particles passing through the lower fluid outlet b. In particular, the closer first concentration of particles passing through the upper fluid outlet a is to the second concentration of particles passing through the lower fluid outlet b, the closer the particle density is to the predetermined density of the carrier fluid 6. By contrast, the greater the difference between the first concentration of particles passing through the upper fluid outlet a is from the second concentration of particles passing through the lower fluid outlet b, the greater the difference is between the density of the particles 4 is from the predetermined density of the carrier fluid 6. Accordingly, with knowledge of the predetermined density of the carrier fluid 6, the particle density can be calculated based at least in part on the difference between the first concentration of particles passing through the upper fluid outlet a and the second concentration of particles passing through the lower fluid outlet b. While reference is made herein to the use of comparison of the first concentration of particles 4 passing through the upper fluid outlet a and the second concentration of particles 4 passing through the lower fluid outlet b, it should be understood that flow rate of particles passing through the upper fluid outlet a and the lower fluid outlet b can also be used. As noted above, the concentration of particles 4 passing through the upper fluid outlet a and the lower fluid outlet b is directly related to the flow rate of particles 4 passing through the upper fluid outlet a and the lower fluid outlet b.

In some embodiments, a predetermined density of the carrier fluid 6, having the particles 4 suspended therein, may be incrementally changed prior to each time the carrier fluid 6 is introduced into the fractionation cell 2, and for each pass of the carrier fluid 6 having an incrementally changed predetermined density through the fractionation cell 2, the flow rates of the particles in the carrier fluid 6 through the upper fluid outlet a and the lower fluid outlet b are measured and compared to each other. When the flow rates through the upper fluid outlet a and the lower fluid outlet b of the fractionation cell 2 are substantially equal so that the ratio of the flow rates is approximately one (1), then it may be concluded that the density of particles 4 suspended in the carrier fluid 6 is approximately equal to the density of the incrementally changed carrier fluid 6 introduced into the channel 14 of the fractionation cell 2 and passing through the upper fluid outlet a and the lower fluid outlet b thereof.

Figure 1A:
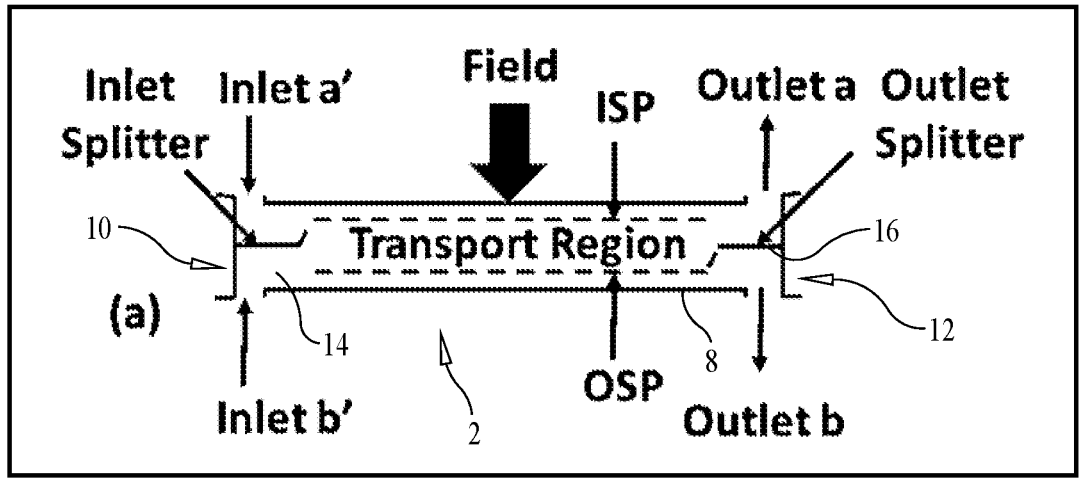
FIG. 1a is a pictorial drawing of a test cell or chamber in which a liquid having particles suspended in the liquid flows therethrough, and illustrates a conventional SPLITT fractionation technique for separating particles having different diameters and/or weights.
Figure 1B:
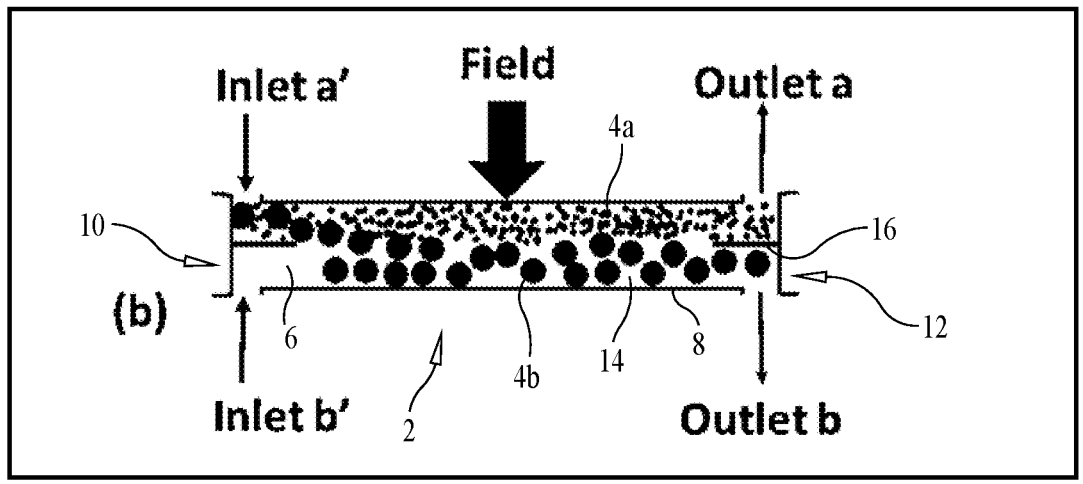
FIG. 1b is a pictorial drawing of a test cell or chamber in which a liquid having particles suspended in the liquid flows therethrough, and illustrates a conventional SPLITT fractionation technique for separating particles having different diameters and/or weights.
Figure 2:
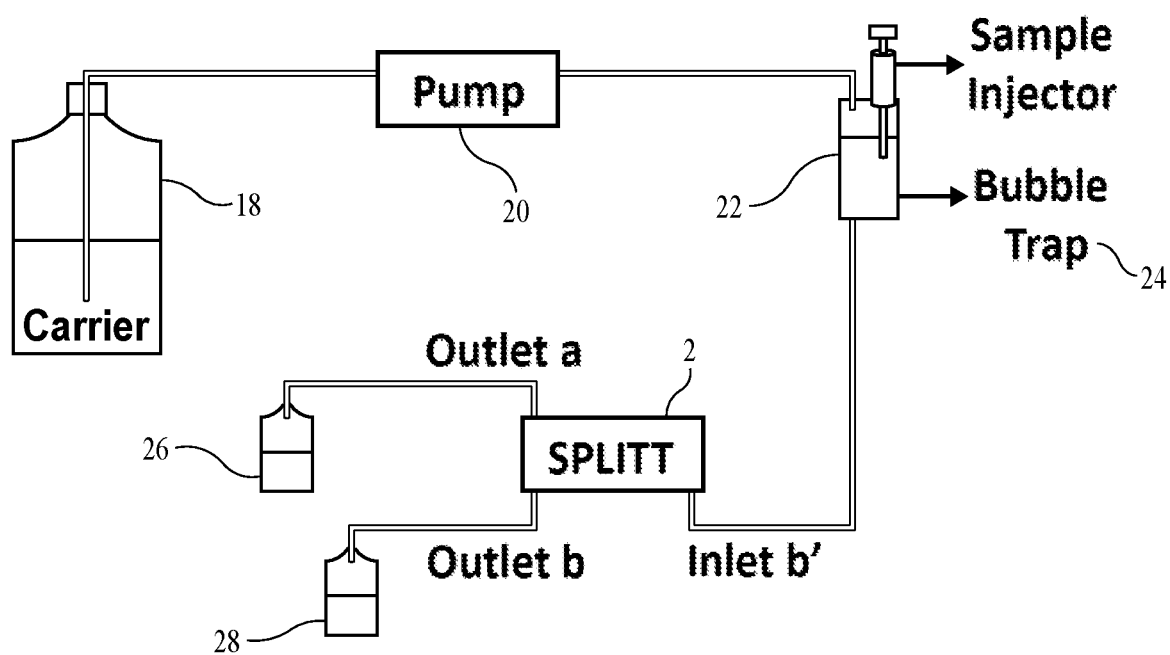
FIG. 2 is a pictorial illustration of an example setup including a fractionation test cell.

FIG. 2 illustrates schematically the implementation of a modified SPLITT fractionation setup in experiments conducted proving the method of the present disclosure for determining the density of particles 4. In one example, the carrier fluid 6 having a predetermined density is drawn from a container 18 using a pump 20 and provided to a vessel 22 into which particles 4 are positioned. This vessel 22 may be connected to a bubble trap 24 to remove any bubbles from the carrier fluid/suspended particle mixture that may affect the experimental results.

The carrier fluid 6, containing the suspended particles 4, in this mixing vessel 22 is provided to inlet b' of a SPLITT fractionation cell 2 (see FIGS. 3(a)-3(c) in this regard). Fluid outlet a of the fractionation cell 2 is in fluid communication with a first container 26 to collect the carrier fluid 6 and particles 4 suspended therein flowing through outlet a. Similarly, fluid outlet b of the fractionation cell 2 is in fluid communication with a second container 28 to collect the carrier fluid 6 and particles 4 suspended therein flowing through outlet b.

The carrier fluid 6 is caused to flow through the channel 14 of the fractionation cell 2 at a predetermined rate, from inlet b' to outlet a and outlet b. The flow rate (particles per minute) of the particles 4 suspended in the carrier fluid 6 passing through outlet a and the flow rate (particles per minute) of the particles 4 suspended in the carrier fluid 6 passing through outlet b are measured (for example, by counting the concentration of the particles 4 for equal volumes of the liquid carrier 6 collected in each container 26, 28). The measured flow rates of the particles 4 through outlet a and outlet b of the fractionation cell 2 are compared, and the ratio between the particle flow rates is measured. If the ratio of the flow rates of the particles 4 in the carrier fluid 6 through outlet a and outlet b is about one (1), then it may be concluded that the density of the particles 4 suspended in the carrier fluid 6 is approximately equal to the predetermined density of the carrier fluid 6 passing through the fractionation cell 2.

In embodiments, carrier fluids 6 having different predetermined densities are pumped through the SPLITT fractionation cell 2, and the flow rates of the particles 4 suspended in the carrier fluid 6 through outlet a and outlet b were measured and compared.

Even though there are several different techniques like FFF which can be used to determine the density of particles in suspension, there are several disadvantages associated with them. The modified SPLITT fractionation method of the present disclosure mitigates these disadvantages and ensures accurate density measurements.

EXAMPLES

In one experimental example, the particles 4a utilized were spherical poly(methyl methacrylate) (PMMA) particles that had a diameter of approximately 2.25 microns and a known density of 1.15 grams/cubic centimeter (gm/cm$^3$). In another example spherical PMMA particles 4b having a diameter of 5.50 micrometer and a known density of 1.2 gm/cm$^3$ (grams per cubic centimeter) were injected into the vessel 22 containing the carrier fluid 6 such that they were suspended therein. The PMMA particles 4a, 4b used in this experiment were obtained from Bangs Laboratories, Inc. of Fishers, Indiana.

The effects of flow rates on the fractionation of the 2.25 micrometers (μm) and 5.5 μm particles 4a, 4b were determined at neutral buoyancy, such that a substantially 50-50 split was observed across both the outlets a, b. In this experimental study, the combined flow rate of the liquid carrier 6 at the outlets a, b was maintained at about 1.4 mL/min (milliliters per minute) for the 2.25 micron particles 4a and the 5.5 micron particles 4b, such that it gave enough time for the different sized particles 4a, 4b to travel through the length of the channel 14 to reach the splitter 16 and result in a substantially 50-50 split across both outlets a, b. Therefore, each outlet a, b has a flow of approximately 0.7 mL/min. Moreover, since a homogeneous size distribution was used, the splitting of particles 4a, 4b based on size was not a concern.

Carrier fluid densities of about $$1.0 \frac{gm}{cm^3}$$

(grams per cubic centimeter), about $$1.1 \frac{gm}{cm^3}$$

(grams per cubic centimeter), about $$1.146 \frac{gm}{cm^3}$$

(grams per cubic centimeter), about $$1.201 \frac{gm}{cm^3}$$

(grams per cubic centimeter), and about $$1.28 \frac{gm}{cm^3}$$

(grams per cubic centimeter) were used in density determination of the approximately 2.25 μm (micron) particles 4a, whereas carrier fluid densities of about $$1.15 \frac{gm}{cm^3}$$

(grams per cubic centimeter), about $$1.175 \frac{gm}{cm^3}$$

(grams per cubic centimeter), about $$1.198 \frac{gm}{cm^3}$$

(grams per cubic centimeter), about $$1.201 \frac{gm}{cm^3}$$

(grams per cubic centimeter), about $$1.207 \frac{gm}{cm^3}$$

(grams per cubic centimeter), and about $$1.28 \frac{gm}{cm^3}$$

(grams per cubic centimeter) were used in the density determination of the larger approximately 5.5 μm (micron) particles 4b. Three different lots of substantially the same carrier fluid density were prepared to calculate the uncertainty associated with lot-to-lot reproducibility. They were prepared using different concentrations of sucrose and DI (deionized) water. At carrier fluid densities lower than the particle density, most of the particles 4a, 4b would be seen in outlet b compared to outlet a, as shown in FIG. 3(*a*). However, for carrier fluid densities larger than the particle density, one expects a population inversion from that shown in FIG. 3(*a*), where most of the particles 4a, 4b would appear in outlet a compared to outlet b. This is shown in FIG. 3(*b*). At neutral buoyancy (approximately $$1.15 \frac{gm}{cm^3}$$

(grams per cubic centimeter) for the 2.25 μm (micron) particles 4a and approximately $$1.20 \frac{gm}{cm^3}$$

(grams per cubic centimeter) for the 5.5 μm (micron) particles 4b), a 50-50 split in population was expected from both outlets a and b, as shown in FIG. 3(*c*). In other words, the different densities of the liquid carrier 6 cause the particles 4a, 4b to be suspended at different vertical heights in the fractionation cell 2 such that the particles 4a, 4b are distributed between fluid outlets a and b. To determine the concentration of the particles 4a, 4b through each fluid outlet a, b, a Beckman Coulter Multisizer 4e particle counter was used.

Figure 4:
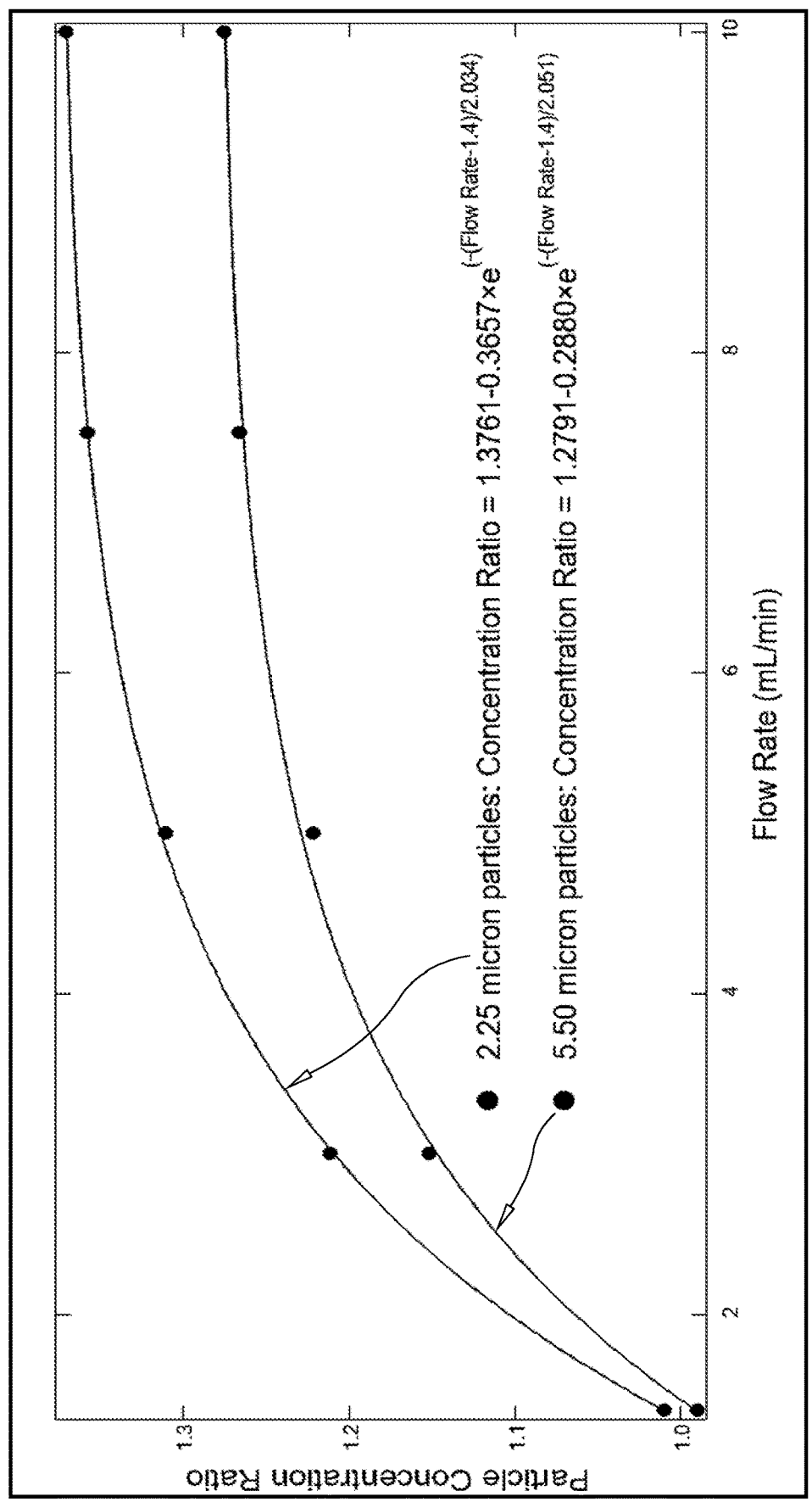
FIG. 4 is a graph showing the ratio of concentration of particles suspended in a liquid carrier flowing through a fractionation cell or chamber such as depicted in FIGS. 3(a)-3(c) in outlet a of the cell to the concentration of particles in outlet b as a function of flow rate through the fractionation cell for (a) particles having a general dimension, or more particularly, diameter, of about 2.25 microns and (b) particles having a general dimension, or more particularly, diameter, of about 5.50 microns.

FIG. 4 shows the effect of particle flow rate on particle concentration ratio, which is the ratio of particle concentration at fluid outlet a to fluid outlet b, at neutral buoyancy. For a concentration ratio of approximately 1, a substantially 50-50 particle split is obtained across both the outlets a, b. From the plot, it can be inferred that for a total flow rate of approximately $$1.4 \frac{mL}{min}$$

(milliliters per minute) through the outlets a, b (approximately $$0.7 \frac{mL}{min}$$

(milliliters per minute) each through outlet a and outlet b), the concentration ratio is approximately 1 for both sizes of particles 4a, 4b at neutral buoyancy. But as flow rate increases, the particle concentration ratio increases as more particles 4a, 4b arrive in outlet a compared to outlet b. Concentration ratio has a (1-exponential decay) relation with respect to flow rate and the expression for concentration ratio is shown in the plot for both particle sizes.

Figure 5A:
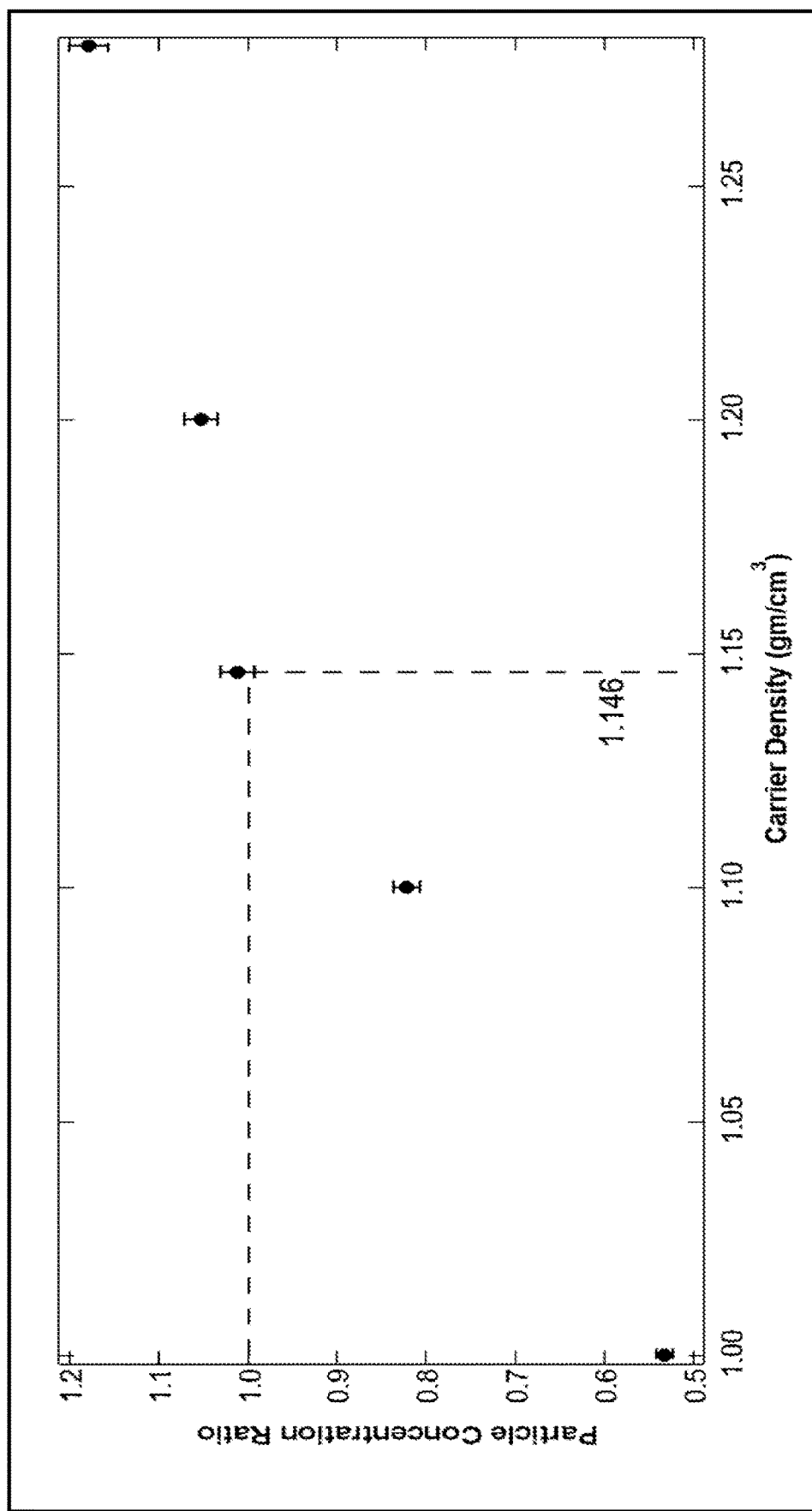
FIG. 5(a) is a graph illustrating the ratio of concentration in outlet a to the concentration of particles in outlet b of a fractionation cell or chamber such as shown in FIGS. 3(a)-3(c) as a function of the density of liquid carrier flowing through the fractionation cell, the particles suspended in the liquid carrier being spherical PMMA (poly(methyl methacrylate)) beads having a diameter of about 2.25 microns.
Figure 5B:
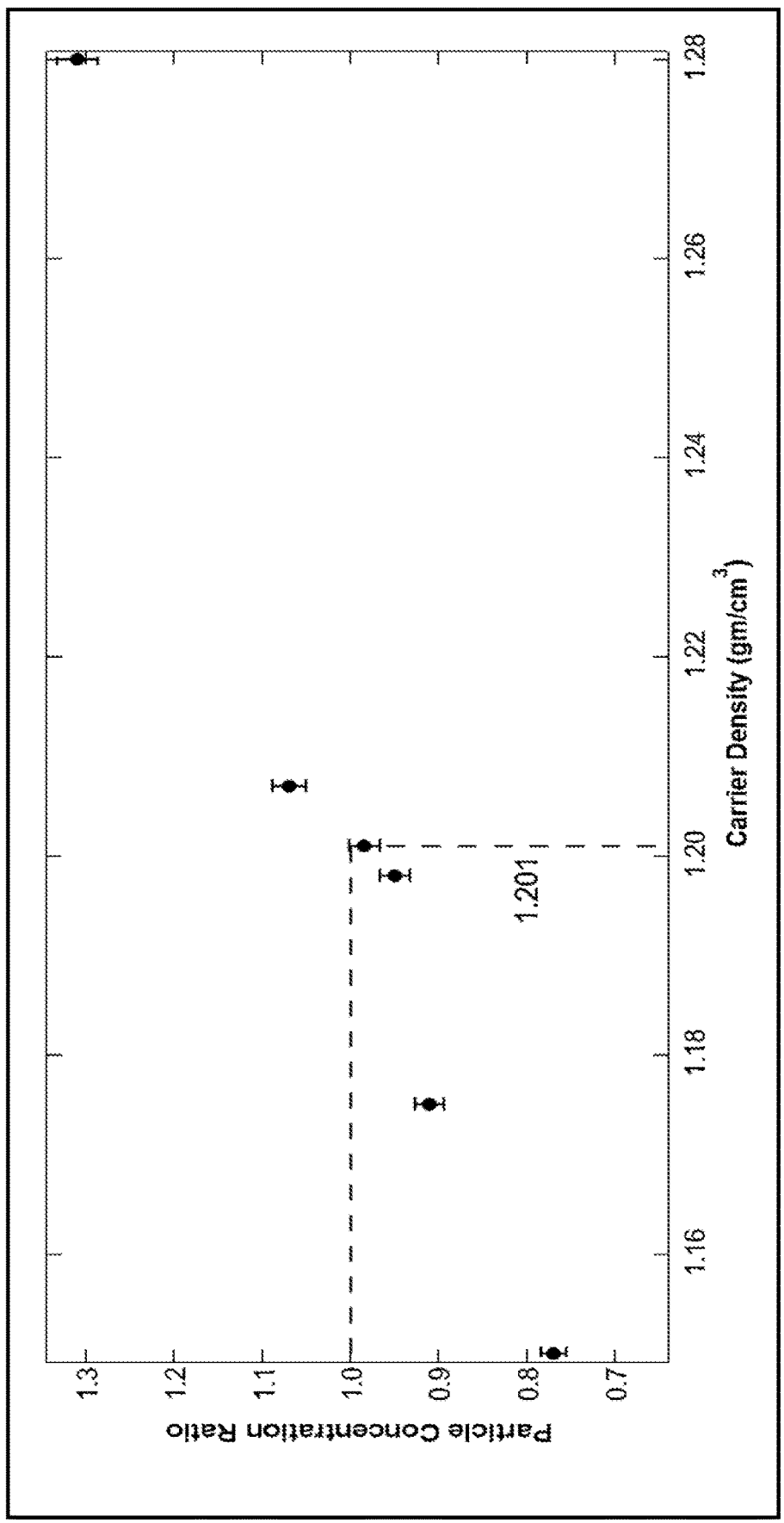
FIG. 5(b) is a graph illustrating the ratio of concentration in outlet a to the concentration of particles in outlet b of a fractionation cell or chamber such as shown in FIGS. 3(a)-3(c) as a function of the density of liquid carrier flowing through the fractionation cell, the particles suspended in the liquid carrier being spherical PMMA beads having a diameter of about 5.50 microns.

FIGS. 5(a) and 5(b) show the particle concentration ratio as a function of carrier fluid density for both 2.25 μm (micron) and 5.5 μm (micron) spherical PMMA particles 4a, 4b. A total flow rate of approximately $$1.4 \frac{mL}{min}$$

(milliliters per minute) was chosen for both particle sizes based on the flow rate study shown in FIG. 4. The error bars, represented by the standard error calculated over three runs, give an estimate of uncertainty in lot-to-lot reproducibility. When the particle concentration ratio is approximately equal to 1, then the particle concentration is substantially the same in both outlets a, b (a 50-50 split) and the particle density substantially matches that of the carrier fluid 6.

From FIG. 5(a), it may be seen that, for a carrier fluid density of about $$1.146 \frac{gm}{cm^3}$$

(grams per cubic centimeter), the particle concentration ratio of 2.25 μm (micron) particles 4a is approximately equal to 1. Similarly, for the larger 5.5 μm (micron) particles 4b, for a carrier fluid density of about $$1.201 \frac{gm}{cm^3}$$

(grams per cubic centimeter), the particle concentration ratio is also approximately equal to 1, as shown in FIG. 5(b). This shows that the calculation of the 2.25 μm (micron) and 5.5 μm (micron) particle densities using the modified SPLITT fractionation method of the present disclosure results in density values which are nearly identical to the values determined by the manufacturer at $$1.15 \frac{gm}{cm^3}$$

(grams per cubic centimeter) and $$1.2 \frac{gm}{cm^3}$$

(grams per cubic centimeter), respectively.

The modified SPLITT fractionation method of the present disclosure is a cost effective, easy to use, fast and highly accurate way to determine the densities of different types of spherical particles 4 in suspension. In accordance with this method, buoyancy is used for particle fractionation by changing the density of the carrier fluid 6 incrementally until it matches the density of the particles 4. The effect of flow rates on particle concentration ratio was experimentally studied at neutral buoyancy, as described herein. Based on the experiments, the flow rates were set to a minimum value of approximately 1.4 mL/min for both particle sizes. This resulted in a near perfect 50-50 split in particle concentration across both outlets a and b of the fractionation cell 2. It is important to note that for particle sizes much larger than those used in the experimental studies described herein, it may be necessary to increase the flow rates to obtain a substantially 50-50 split in particle concentration at the outlets a, b. When particle density matches the density of the carrier fluid 6, neutral buoyancy is achieved and a near perfect 50-50 split in particle concentration is obtained in both outlets a and b. The results of density determination of 2.25 μm and 5.5 μm spherical PMMA particles 4a, 4b are described herein and shown in FIGS. 3(a)-5(b), and clearly demonstrate that the modified SPLITT fractionation method of the present disclosure can be used to accurately determine particle density in suspension.

Numbered aspects of the present disclosure will now be provided in the following paragraphs.

In a first aspect A1, the present disclosure provides a method for determining the density of particles, the method comprising passing a carrier fluid and particles suspended within the carrier fluid axially through a fractionation cell at a predetermined rate, wherein the carrier fluid has a predetermined density, the fractionation cell has a housing including a first axial end and a second axial end opposite the first axial end and the fractionation cell defines an interior carrier fluid flow-through channel extending between the first axial end and the second axial end, and at least an upper fluid outlet and a lower fluid outlet positioned below the upper fluid outlet in a vertical direction, the upper fluid outlet and the lower fluid outlet in fluid communication with the channel and positioned at the second axial end of the housing, passing the carrier fluid and the particles through the upper fluid outlet and the lower fluid outlet, measuring a first concentration of particles passing through the upper fluid outlet, measuring a second concentration of particles passing through the lower fluid outlet, and determining a density of the particles based at least in part on the first concentration and the second concentration of particles.

In a second aspect A2, the present disclosure provides the method of aspect A1, wherein determining the density of the particles comprises determining a ratio of the first concentration with respect to the second concentration.

In a third aspect A3, the present disclosure provides the method of either of aspects A1 or A2, further comprising determining that the first concentration is greater than the second concentration, and in response to determining that the first concentration is greater than the second concentration, determining that the density of the particles is less than a density of the carrier fluid.

In a fourth aspect A4, the present disclosure provides the method of either of aspects A1 or A2, further comprising determining that the first concentration is less than the second concentration, and in response to determining that the first concentration is less than the second concentration, determining that the density of the particles is greater than a density of the carrier fluid.

In a fifth aspect A5, the present disclosure provides the method of either of aspects A1 or A2, further comprising determining that the first concentration is about the same as the second concentration, and in response to determining that the first concentration is about the same as the second concentration, determining that the density of the particles is about the same as a density of the carrier fluid.

In a sixth aspect A6, the present disclosure provides the method of any of aspects A1-A5, wherein the fractionation cell defines a separator wall extending from the second axial end of the housing at least partially axially into the channel between the upper fluid outlet and the lower fluid outlet.

In a seventh aspect A7, the present disclosure provides the method of any of aspects A1-A6, wherein the fractionation cell defines a fluid inlet in fluid communication with the channel and positioned at the first axial end of the housing and into which the carrier fluid is introduced into the channel.

In an eighth aspect A8, the present disclosure provides the method of aspect A7, wherein the fluid inlet is a first fluid inlet, and the fractionation cell further defines a second fluid inlet positioned at the first axial end of the housing.

In a ninth aspect A9, the present disclosure provides the method of any of aspects A1-A8, wherein measuring the first concentration comprises measuring a flow rate of particles passing through the upper fluid outlet.

In a tenth aspect A10, the present disclosure provides a method for determining the density of particles, the method comprising (a) passing a carrier fluid and particles suspended within the carrier fluid axially through a fractionation cell at a predetermined rate, wherein the carrier fluid has a predetermined density, the fractionation cell has a housing including a first axial end and a second axial end opposite the first axial end and the fractionation cell defines an interior carrier fluid flow-through channel extending between the first axial end and the second axial end, and at least an upper fluid outlet and a lower fluid outlet positioned below the upper fluid outlet in a vertical direction and the upper fluid outlet and the lower fluid outlet in fluid communication with the channel and positioned at the second axial end of the housing, (b) passing the carrier fluid and the particles through the upper fluid outlet and the lower fluid outlet, (c) measuring a first concentration of particles passing through the upper fluid outlet, (d) measuring a second concentration of particles passing through the lower fluid outlet, (e) determining whether the first concentration is greater than or less than the second concentration, and (f) in response to determining the first concentration is greater than or less than the second concentration, changing a predetermined density of the carrier fluid, and repeating steps (a)-(e).

In an eleventh aspect A11, the present disclosure provides the method of aspect A10, wherein, in response to determining that the first concentration is greater than the second concentration, decreasing the predetermined density of the carrier fluid and repeating steps (a)-(e).

In a twelfth aspect A12, the present disclosure provides the method of aspect A10, wherein, in response to determining that the first concentration is less than the second concentration, increasing the predetermined density of the carrier fluid and repeating steps (a)-(e).

In a thirteenth aspect A13, the present disclosure provides the method of aspect A10, further comprising determining that the first concentration is about the same as the second concentration, determining that a density of the particles is about the same as the predetermined density of the carrier fluid.

In a fourteenth aspect A14, the present disclosure provides the method of any of aspects A10-A12, further comprising in response to determining that the first concentration is greater than or less than the second concentration, determining a difference between the first concentration and the second concentration, and calculating a density of the particles based at least in part on the difference between the first concentration and the second concentration.

In a fifteenth aspect A15, the present disclosure provides a method for determining the density of particles, the method comprising passing carrier fluid and particles suspended within the carrier fluid axially through a fractionation cell at a predetermined rate, wherein the carrier fluid has a predetermined density, the fractionation cell has a housing including a first axial end and a second axial end opposite the first axial end and the fractionation cell defines an interior carrier fluid flow-through channel extending between the first axial end and the second axial end, and at least an upper fluid outlet and a lower fluid outlet positioned below the upper fluid outlet in a vertical direction and the upper fluid outlet and the lower fluid outlet in fluid communication with the channel and positioned at the second axial end of the housing, passing the carrier fluid and the particles through the upper fluid outlet and the lower fluid outlet, measuring a first flow rate of particles passing through the upper fluid outlet, measuring a second flow rate of particles passing through the lower fluid outlet, and determining a density of the particles based at least in part on the first flow rate and the second flow rate of particles.

In a sixteenth aspect A16, the present disclosure provides the method of aspect A15, further comprising determining that the first flow rate is greater than the second flow rate, and in response to determining that the first flow rate is greater than the second flow rate, determining that the density of the particles is less than a density of the carrier fluid.

In a seventeenth aspect A17, the present disclosure provides the method of aspect A15, further comprising determining that the first flow rate is less than the second flow rate, and in response to determining that the first flow rate is less than the second flow rate, determining that the density of the particles is greater than a density of the carrier fluid.

In an eighteenth aspect A18, the present disclosure provides the method of aspect A15, further comprising determining that the first flow rate is about the same as the second flow rate, and in response to determining that the first flow rate is about the same as the second flow rate, determining that the density of the particles is the same as a density of the carrier fluid.

In a nineteenth aspect A19, the present disclosure provides the method of any of aspects A15-A18, wherein the fractionation cell defines a separator wall extending from the second axial end of the housing at least partially axially into the channel between the upper fluid outlet and the lower fluid outlet.

In a twentieth aspect A20, the present disclosure provides the method of any of aspects A15-A19, wherein measuring the flow rate of particles passing through the upper fluid outlet comprises measuring a concentration of particles passing through the upper fluid outlet.

Although illustrative embodiments of the present disclosure have been described herein with reference to the accompanying drawings, it is to be understood that the disclosure is not limited to those precise embodiments, and that various other changes and modifications may be effected therein by one skilled in the art without departing from the scope or spirit of the disclosure.

What is claimed is:

1. A method for determining the density of particles, the method comprising:
 passing a carrier fluid and particles suspended within the carrier fluid axially through a fractionation cell at a predetermined rate, wherein:
  the carrier fluid has a predetermined density;
  the fractionation cell has a housing including a first axial end and a second axial end opposite the first axial end and the fractionation cell defines:
   an interior carrier fluid flow-through channel extending between the first axial end and the second axial end; and
   at least an upper fluid outlet and a lower fluid outlet positioned below the upper fluid outlet in a vertical direction, the upper fluid outlet and the lower fluid outlet in fluid communication with the channel and positioned at the second axial end of the housing;
 passing the carrier fluid and the particles through the upper fluid outlet and the lower fluid outlet;
 measuring a first concentration of particles passing through the upper fluid outlet;
 measuring a second concentration of particles passing through the lower fluid outlet; and
 determining a density of the particles based at least in part on the first concentration and the second concentration of particles.

2. The method of claim 1, wherein determining the density of the particles comprises determining a ratio of the first concentration with respect to the second concentration.

3. The method of claim 1, further comprising:
 determining that the first concentration is greater than the second concentration; and
 in response to determining that the first concentration is greater than the second concentration, determining that the density of the particles is less than a density of the carrier fluid.

4. The method of claim 1, further comprising:
 determining that the first concentration is less than the second concentration; and
 in response to determining that the first concentration is less than the second concentration, determining that the density of the particles is greater than a density of the carrier fluid.

5. The method of claim 1, further comprising:
 determining that the first concentration is about the same as the second concentration; and
 in response to determining that the first concentration is about the same as the second concentration, determining that the density of the particles is about the same as a density of the carrier fluid.

6. The method of claim 1, wherein the fractionation cell defines a separator wall extending from the second axial end of the housing at least partially axially into the channel between the upper fluid outlet and the lower fluid outlet.

7. The method of claim 1, wherein the fractionation cell defines a fluid inlet in fluid communication with the channel and positioned at the first axial end of the housing and into which the carrier fluid is introduced into the channel.

8. The method of claim 7, wherein the fluid inlet is a first fluid inlet, and the fractionation cell further defines a second fluid inlet positioned at the first axial end of the housing.

9. The method of claim 1, wherein measuring the first concentration comprises measuring a flow rate of particles passing through the upper fluid outlet.

* * * * *